US010834933B2

(12) United States Patent
Nace et al.

(10) Patent No.: US 10,834,933 B2
(45) Date of Patent: Nov. 17, 2020

(54) METHOD OF PROCESSING POULTRY AND OTHER MEAT TO REDUCE OR ELIMINATE SALMONELLA

(71) Applicant: Birko Corporation, Henderson, CO (US)

(72) Inventors: Gary L. Nace, Claude, TX (US); Terry L. McAninch, Westminster, CO (US); Victor M. Reusch, Arvada, CO (US); Elis M. Owens, Littleton, CO (US)

(73) Assignee: Birko Corporation, Henderson, CO (US)

( * ) Notice: Subject to any disclaimer, the term of this patent is extended or adjusted under 35 U.S.C. 154(b) by 0 days.

(21) Appl. No.: 15/941,880

(22) Filed: Mar. 30, 2018

(65) Prior Publication Data

US 2018/0220663 A1 Aug. 9, 2018

Related U.S. Application Data

(63) Continuation of application No. 12/806,317, filed on Aug. 10, 2010, now abandoned, and a continuation-in-part of application No. 12/151,826, filed on May 9, 2008, now abandoned.

(60) Provisional application No. 61/274,282, filed on Aug. 14, 2009, provisional application No. 61/070,453, filed on Mar. 22, 2008, provisional application No. 60/928,941, filed on May 11, 2007.

(51) Int. Cl.
*A23B 4/12* (2006.01)
*A23B 4/28* (2006.01)
*A23B 4/30* (2006.01)

(52) U.S. Cl.
CPC .............. *A23B 4/12* (2013.01); *A23B 4/28* (2013.01); *A23B 4/30* (2013.01)

(58) Field of Classification Search
CPC .............. A23B 4/12; A23B 4/28; A23B 4/30
USPC .................................................. 426/332
See application file for complete search history.

(56) References Cited

U.S. PATENT DOCUMENTS 5,234,703 A * 8/1993 Guthery ............... A23B 4/18
134/25.3

OTHER PUBLICATIONS

Bautista, D. A. et al. Int. J. Food Microbiol. 34: 279-292 (1997) (Year: 1997).*
Smulders, F. J. M. et al. J. Food Technol. 21: 419-436 (1986) (Year: 1986).*
Nazer, A. I. et al. Food Microbiol. 22 : 391-398 (2005) (Year: 2005).*
Laury, A. M. et al. J. Food Protec. 72: 2208-22-11 (2009) (Year: 2009).*
Laury, A. M. et al. J. Food Protec. 72(10): 2208-2211 (2009) (Year: 2009).*

* cited by examiner

*Primary Examiner* — Hamid R Badr
(74) *Attorney, Agent, or Firm* — Magleby, Cataxinos & Greenwood, P.C.

(57) ABSTRACT

A method for reducing the incidence of *Salmonella* in harvested poultry comprising treating the poultry with an effective antimicrobial solution comprising a blend of lactic and citric acids in proportions containing a predominance of lactic acid from 50:30 wt./wt. to 75:5 wt./wt. lactic acid to citric acid; and the pH of the solution is less than about 3.2.

21 Claims, 11 Drawing Sheets

FIGURE 1 – PRIOR ART

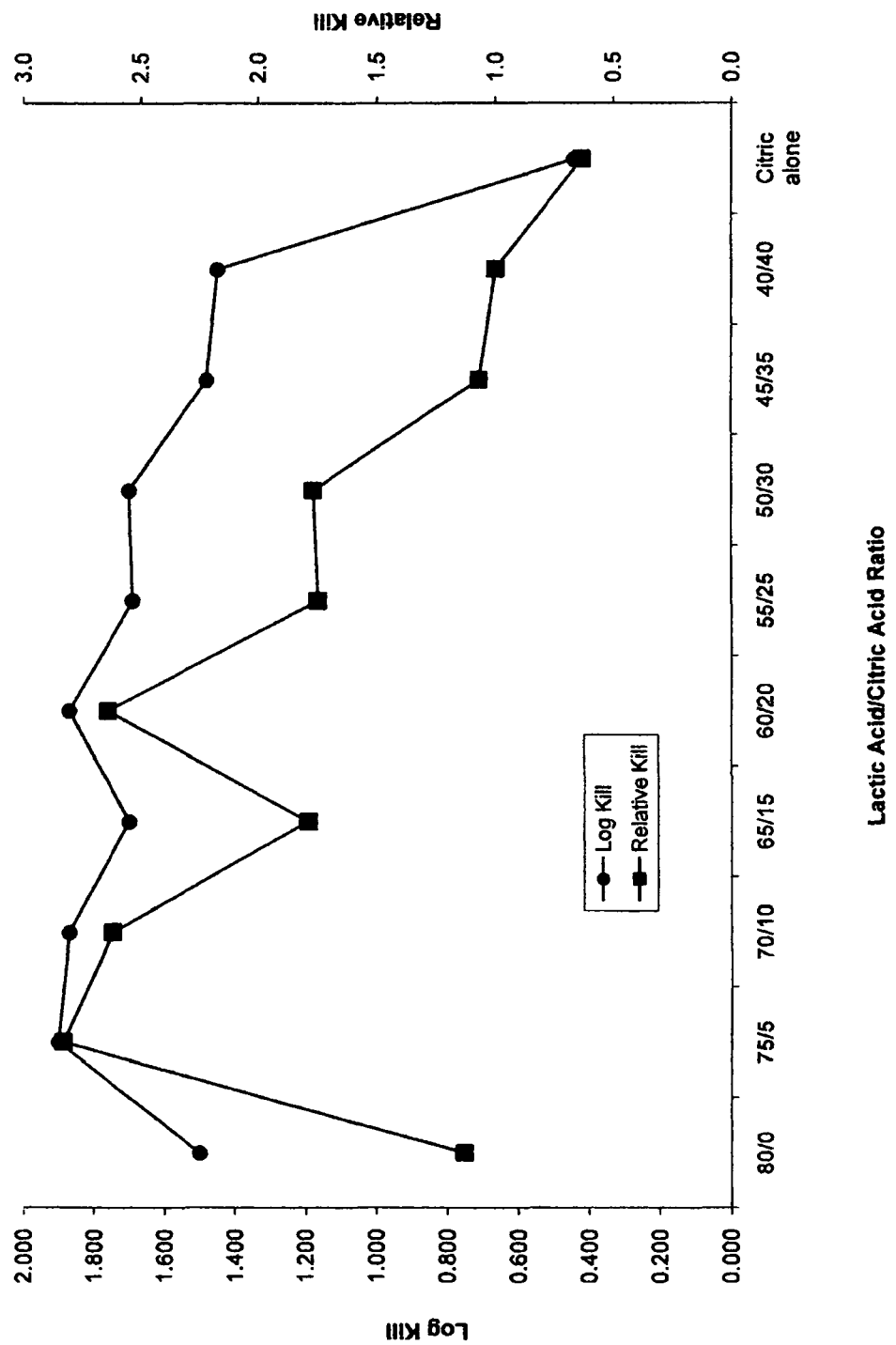

METHOD OF PROCESSING POULTRY AND OTHER MEAT TO REDUCE OR ELIMINATE SALMONELLA

PRIORITY INFORMATION

This application is a continuation of U.S. patent application Ser. No. 12/806,317 filed Aug. 10, 2010, which claims benefit to U.S. Provisional Patent Application No. 61/274,282, filed Aug. 14, 2009; and is a continuation-in-part of U.S. patent application Ser. No. 12/151,826 filed May 9, 2009; which claims benefit to U.S. Provisional Patent Application No. 61/070,453 filed Mar. 22, 2008; and claims benefit to U.S. Provisional Patent Application No. 60/928,941 filed May 11, 2007, all of which are incorporated by reference herein.

FIELD OF THE DISCLOSURE

The present invention related to an improved method for processing poultry, other meat or food products in a manner that substantially reduces or eliminates *Salmonella* in the resulting products without affecting desirable characteristics of those products, such as their appearance, taste or aroma.

BACKGROUND OF THE DISCLOSURE

The United States poultry industry processes approximately nine billion chickens, turkeys, and other fowl (collectively, "poultry") annually with a sales value in excess of $20 billion. In recent years, chicken and turkey, for example, have been perceived by some consumers as being healthier and/or less expensive than certain other protein options, such as, red-meat. For these and other reasons, the U.S. poultry industry has been expanding at a rate of 3 to 6 percent annually.

Food safety is the most important issue in the poultry industry. Consumers are constantly reminded that chicken and turkey must be cooked thoroughly and that cooked meat should not contact un-cleaned surfaces, such as cutting boards and countertops, on which the uncooked meat was processed. The reason for this is to avoid *Salmonella* contamination in the chicken or turkey that is consumed.

The majority of live chickens and turkeys carry *Salmonella*, and at least two-thirds of live poultry carry *Campylobacter*. *Salmonella* and *Campylobacter* are the two leading bacterial causes of food poisoning in the United States. According to the Center for Disease Control, there are 40,000 reported cases of *Salmonella* poisoning and 600 deaths annually. The CDC estimates that the actual number of *Salmonella* cases is approximately 30 times the number of reported events. Obviously, it is highly desirable for producers to deliver processed poultry with minimal incidence of these bacteria. For a number of reasons, however, government regulations allow up to a 50% incidence of *Salmonella* on uncooked poultry sold for consumption. Assuming that the poultry is properly prepared for eating, there should be minimal risk of illness from bacterial poisoning. Obviously, from the statistics quoted previously, reliance on proper cooking and preparation by consumers is not dependable. In February 2006, the USDA announced an initiative to further reduce the incidence of *Salmonella* in meat and poultry.

While it is possible to promulgate regulations mandating a zero percent tolerance, i.e., incidence, for *Salmonella* in poultry leaving a production plant, no known process exists at the present time for achieving that lofty and desirable goal.

Various chemical treatments have been tried. A survey of the poultry industry in March 2006 revealed the use of a number of chemicals in "online processing" to reduce *Salmonella*. In the order of most to least used, those chemicals included: acidified sodium chlorite; trisodium phosphate; chlorine dioxide; hypochlorous acid; organic acids, peracetic acid; cetylpyridinium chloride; citric acid and HCL; bromine; sodium metasilicate; and electrolyzed oxidative brine. Organic acids approved for use include lactic; acetic and citric acids. Acetic acid, however, has a flavor/taste issue. To mitigate that problem and issues of poultry discoloration, acetic acid must be used at low concentrations that significantly diminish the antimicrobial efficacy. Also, acetic acid is flammable. Citric acid, on the other hand, is generally believed not to be a particularly good antimicrobial. Also, it is normally available in a crystalline form, is difficult to deal with and involves more handling for the user. To the extent that citric acid is available in solution, it is not at the correct concentration level and would still involve additional handling. Thus, lactic acid, which is a good antimicrobial, is currently the most frequently employed of the organic acids.

However, none of the various chemicals listed above and others have been able to achieve a zero tolerance efficacy level for *Salmonella*. Efforts to improve efficacy levels through the application of larger doses of chemical have been accompanied by discoloration of the meat and "off-smells" or tastes that are offensive or objectionable to potential purchasers and consumers. Many of the chemical treatments are quite expensive even at dosage levels that barely meet the 50% incidence level.

Accordingly, there has been a significant industry and public need for improved processes that can inexpensively and effectively reduce the incidence of *Salmonella* and other pathogens in poultry products leaving the production plant and that can do so without adversely affecting the color, smell or taste of the poultry.

SUMMARY OF THE INVENTION

Parent patent application Ser. No. 12/151,826, discloses the use of blends of citric and lactic acid (e.g., Purac "CL 21/80," a buffered solution of those two acids in the preparation of approximately 47:33 wt./wt. lactic acid to citric acid) as an antimicrobial agent particularly effective against *Salmonella* contamination in the processing of poultry. In particular, it was found that the foregoing needs could be met by processing poultry in the harvesting plant with a buffered blend of lactic acid and citric acid at conditions referenced in that application. That patent application disclosed that the blend of lactic acid and citric acid can be employed at one or more steps during processing of the poultry and can be employed in various manners, e.g., spray, mist, bath, dip, etc. In a preferred embodiment of the invention, the acid blend was applied to the carcasses in two separate applications. The first was a spray after the feathers are plucked from the bird, i.e., pre-evisceration. The second was a "dip" or bath that is employed post-evisceration and prior to chilling.

Experimental tests verified that the use of citric and lactic acid blends is very effective in reducing the incidence of *Salmonella* in the poultry or impart an off-taste or smell to the poultry products. Also, it significantly reduced the presence of other pathogens in processed poultry.

The present application discloses further unexpected refinements to this technology. First, it has been discovered that certain mixtures of citric and lactic acid are significantly better than others as antimicrobial agents against *Salmonella*. The preferred range includes mixtures of lactic and citric in proportions containing a predominance of lactic acid down to a minimum of about 40:40 wt./wt. lactic acid to citric acid, and preferably ranging down to about 45:35 wt./wt. lactic acid to citric acid. In one embodiment preferred mixtures include lactic and citric acid in proportions of about 77:3 on a wt./wt. basis down to a minimum of about 45:35 wt./wt. lactic acid to citric acid and more preferably from about 75:5 wt./wt. lactic acid to citric acid down to about 50:30 lactic acid to citric acid. In situations where a solution is employed containing about 2% total acids, the preferred range is 77:3 down to a minimum of about 45:35 wt./wt. lactic acid to citric acid solution, and more preferably down to about 55:25 wt./wt. lactic acid to citric acid. Second, it has been shown that the antimicrobial agent is much more effective when it is employed at a pH of less than about 3.2 and preferably in the range of about 1.8 to 3.2. Even more preferably, the antimicrobial agent is applied at the pH of about 1.8 to about 3.0 and most preferably in the range of about 1.8 to about 2.5. Thus, the use of a pH buffering agent is generally contraindicated.

BRIEF DESCRIPTION OF THE DRAWINGS

FIGS. 5A, 5B and 5C charts depicting the results of the experiments described in Example 4 showing the effect of aqueous solutions of various mixtures of lactic and citric acid blends on *Salmonella*.

DETAILED DESCRIPTION OF THE DISCLOSURE

Figure depicts a typical production process for harvesting and processing poultry for market. Live chickens are brought into the production plant in crates and are unavoidably covered in part with feces carrying *Salmonella* and other pathogenic bacteria. The chickens are removed from the crates and hung upside down. In that position they are stunned, and their throats ar cut, so that the blood can drain thoroughly. The carcasses are then put in a scalding tank where they are treated for about 5-7 minutes with water at about 138-142 degrees F. On some occasions, an alternative low temperature scalding process is carried out at approximately 124 degrees F. The scalding prepares the carcass for removal of the feathers and kills bacteria or inhibits bacterial growth. On the other hand, the scalding tank often promotes cross-contamination of poultry entering the tank by contact with water contaminated by bacteria from previously processed poultry. The poultry are then sent to one or more "pluckers," available in various configurations, for removal of the feathers. The de-feathered carcasses are then rinsed with potable water, also at about 138-142 degrees F. The hot water rinse assists in removal of scurf and final removal of any residual feathers.

The carcasses are then placed on an automated evisceration and inspection line. Along the line the poultry are eviscerated, and remaining heads are removed, and parts that appear visibly to be contaminated are cut off. The carcasses are then subject to a "final" rinse with water at ambient temperature.

At this point, the carcasses are subjected to an "antimicrobial intervention." Typically, this is a chemical spray. As previously mentioned, typical chemicals include acidified sodium chlorite, peracetic acid, acidified calcium sulfate, chlorine bleach (either calcium or sodium hypochlorite) or another "processing aid" approved by the USDA-FSIS.

After the antimicrobial treatment, the treated carcasses pass through a chiller where the processed chickens are subject to cooling with cold air or in "ice" (i.e., refrigerated) water for a sufficient time to bring their temperature down to about 35 to 40° F. After chilling, the carcasses are either sold as "whole" poultry or are cut up and sold in various assortments of "parts."

Figure 1:
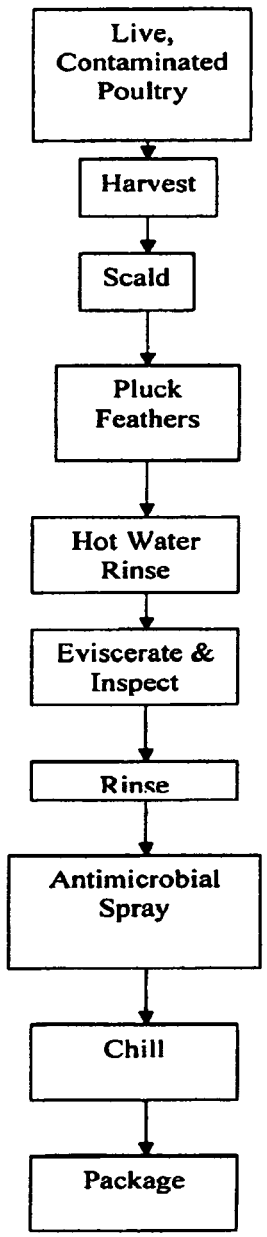
FIG. 1 is a schematic depicting a typical prior art process for processing poultry.
Figure 2:
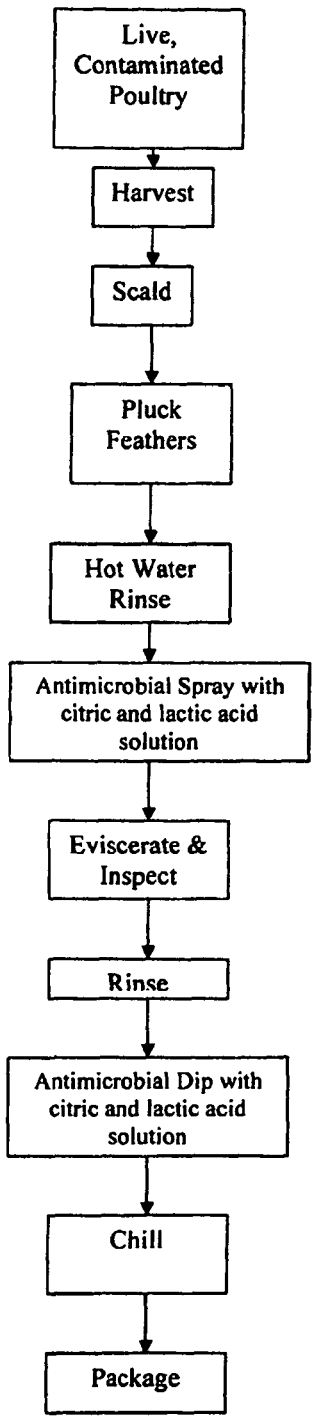
FIG. 2 is a schematic depicting one presently preferred embodiment for processing poultry.

In contrast, FIG. 2 depicts one presently preferred embodiment of the present invention. The initial steps are essentially the same as in FIG. 1. However, immediately after the plucking step and the hot water rinse, the de-feathered carcasses are subjected to an antimicrobial spray. For example, the spray can employ a 2.5 wt. % aqueous solution of a mixture of citric and lactic acids as described below. (As used herein, the concentration of antimicrobial agent or ingredients therein is specified in wt./wt. %.) The spray is applied for about 5 to 10 seconds to each carcass as the carcasses pass through a spray booth. The concentration can vary from approximately 1% to 2.5 wt. %. Using this process step (i.e., antimicrobial spray following plucking) alone resulted in a reduction of about 30% in the incidence of *Salmonella* on carcasses treated to this same point (i.e., hot water rinse after plucking) in the conventional process of FIG. 1.

In an alternative and sometimes preferred embodiment of the present invention, the antimicrobial spray is employed after plucking but before the hot water rinse. In other words, the antimicrobial spray and the hot water rinse can be employed in either order. The antimicrobial intervention can be conducted at ambient temperature or at an elevated temperature provided that there is no carcass discoloration.

It is believed that the microbial reduction is in large part due to the application of the blend of citric and lactic acids. However, the application of antimicrobial agent at this point in processing is not a typical part of the poultry production process. It appears that the scalded and plucked carcass may be particularly susceptible to antimicrobial treatment at this stage.

Following this initial antimicrobial treatment, the carcasses are then placed on the evisceration line and processed as mentioned previously. However, it has now been found that it is especially efficacious to use an antimicrobial agent comprising a blend of citric acid and lactic acids in the post-evisceration antimicrobial control. Again, the concentration of the acid blend may be approximately 1% to 2.5 wt % of the aqueous solution on a weight basis. As shown in FIG. 2, a preferred method of applying the mixture of acids is to use a "dip." Preferably, the carcasses are placed in the dip for about 5-10 seconds to approximately one minute. It is believed that there is better contact of the carcass with the antimicrobial gent in the dip. However, an antimicrobial spray would also be beneficially employed as an alternative. Preferably a solution of about 1 to about 2.5 wt % of the mixture of citric and lactic acids is employed. The bath should be monitored to make sure that the concentration remains in this range. If the level falls below 1%, the antimicrobial agent may not be as effective as desired. If the concentration exceeds 2.5%, the carcasses may develop an undesirable gray color and objectionable odor. Preferably the concentration of the mixture of citric and lactic acids in the solution is in the range of about 1.2 to 2.0 wt. %. One way to help control the concentration is to slowly feed, e.g., "drip," antimicrobial solution into the dip tank. Alternatively, the antimicrobial solution can be added to the tank and blended with water to the desired concentration. In either event, it is desirable to monitor the concentration about every 15-20 minutes to ensure that the concentration is maintained at the proper level. The used of the antimicrobial dip results in a 90% reduction in *Salmonella*, i.e., 90% of the poultry carcasses with *Salmonella* before treatment will be *Salmonella* free after treatment.

Following the antimicrobial dip, it has also been found desirable to use a rinse employing potable water or any other USDA approved final rinse step, such as chlorinated water, within the approved concentration(s). In the case of a chlorinated water rinse, a typical concentration is between about 20-5-ppm with these limits being generally established under current regulations for available chlorine in the poultry rinse water and poultry chill water, respectively. Each carcass should be subjected to the spray for between about 1 to 6 seconds. After the treatment with the aqueous chlorine spray, the carcasses are then sent into an air chiller. In the event that the production facility uses a refrigerated bath for chilling, the chlorine (or other USDA approved substance at proper concentration(s)) can be added to the bath rather than using a separate spray.

The preferred antimicrobial agent used in the present invention comprises a blend of lactic and citric acids in a preferred range of proportions. It has now been found that the combination of acids should include a predominance of lactic acid down to a minimum of about 40:40 wt./wt. lactic acid to citric acid, and preferably ranging down to about 45:35 wt./wt. lactic acid to citric acid. In one embodiment preferred mixtures include lactic and citric acid in proportions of about 77:3 on a wt./wt. basis down to a minimum of about 45:35 wt./wt. lactic to citric acid and more preferably from about 75:5 wt./wt. lactic acid to citric acid down to about 50:30 lactic acid to citric acid. This is counter-intuitive for a number of reasons.

Figure 3A:
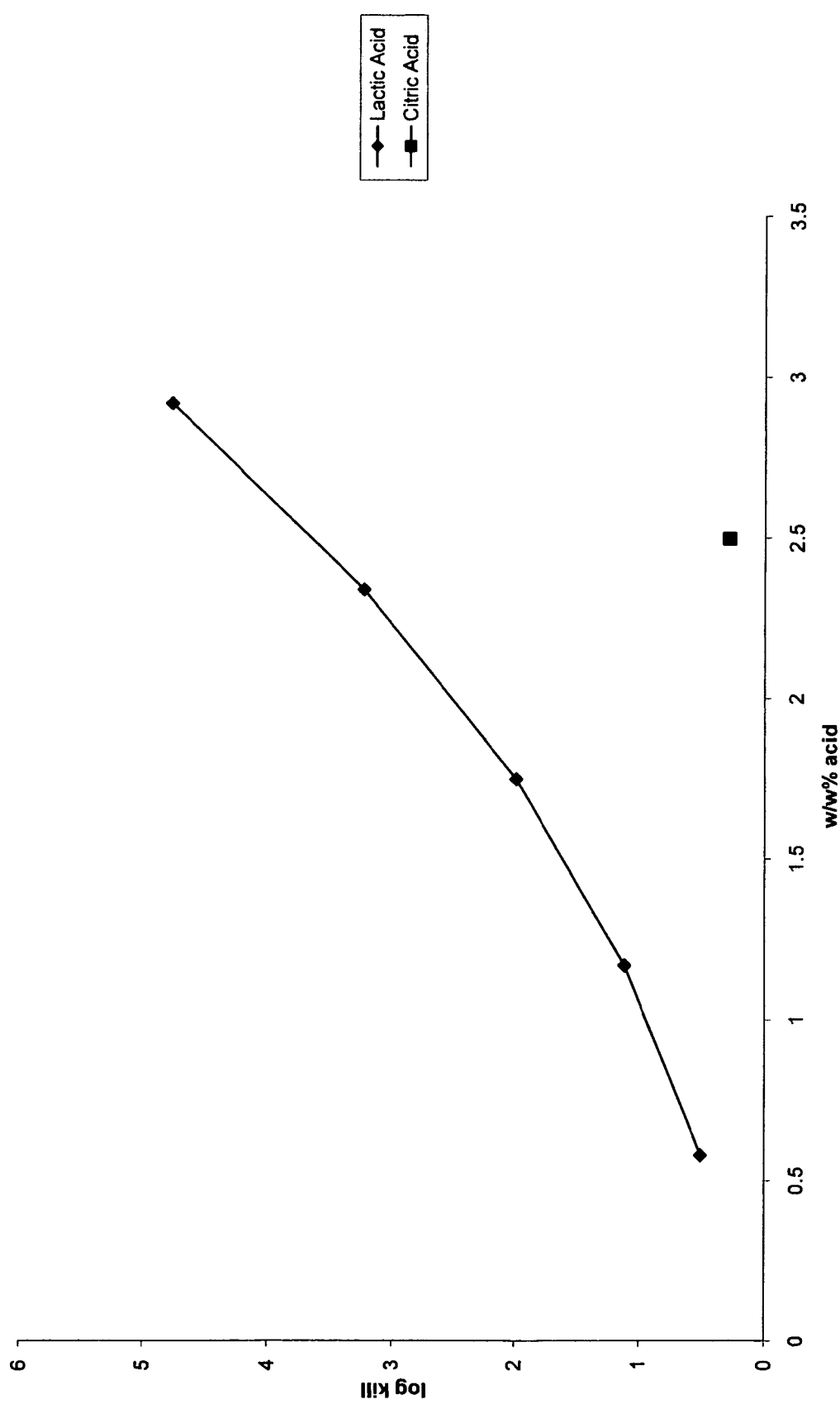
FIGS. 3A and 3B are charts depicting the results of the experiments described in Example 2 showing the effect of various concentrations of lactic acid solution on *Salmonella*.
Figure 5A:
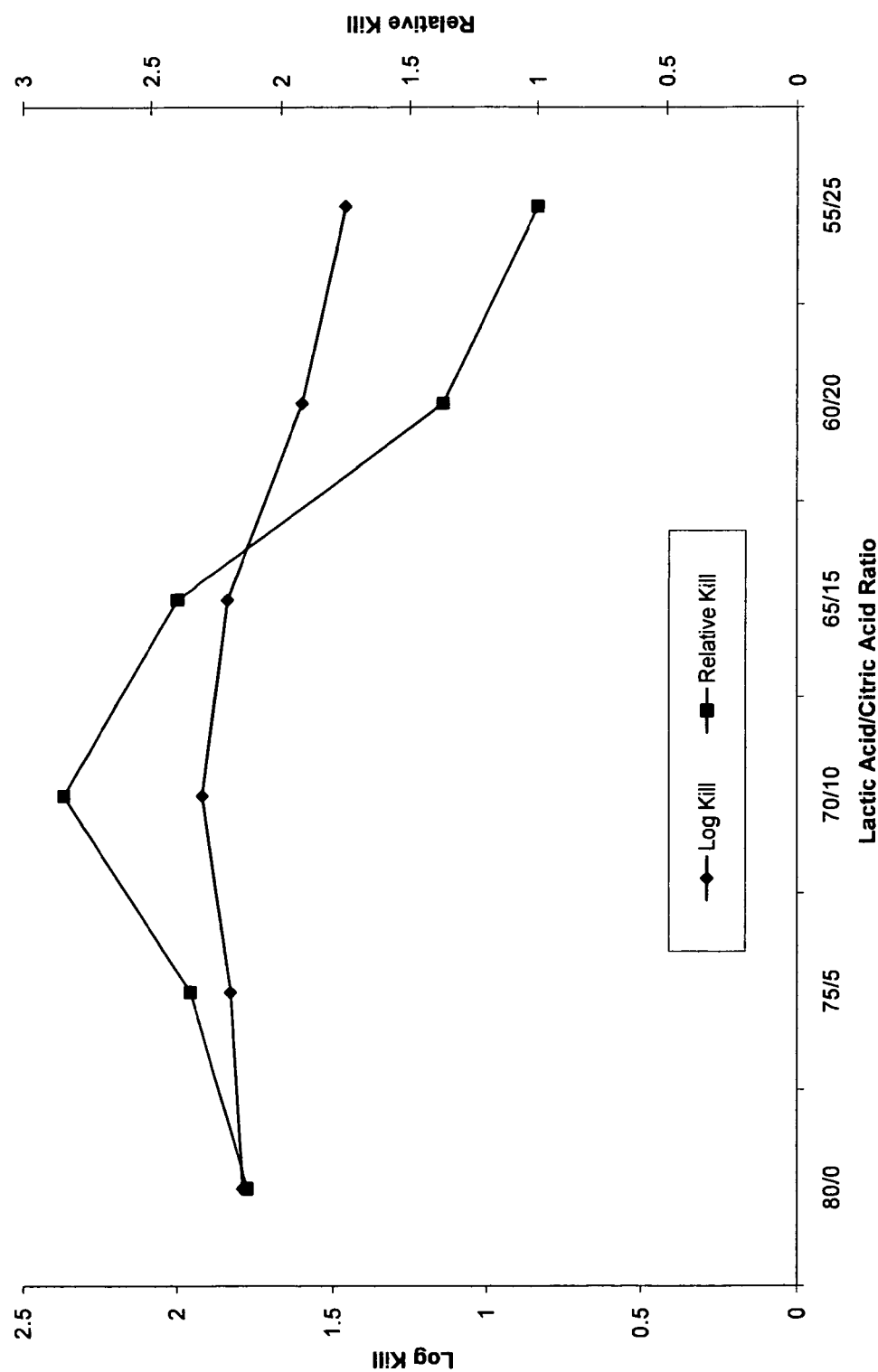

As detailed in Tables 1A and depicted in corresponding FIG. 3A, citric acid and lactic acid are not comparable as antimicrobial agents against *Salmonella*. At identical concentrations of 2.5% and identical treatment times of 80 seconds at room temperature, lactic acid had a log kill of at least 6, i.e., a complete, 100% kill of *Salmonella*. In contrast, citric acid had a kill of only 0.29. A 2.5% solution of lactic acid alone achieved a log kill reduction of 5.36 with a treatment time of only 20 seconds. Results on *Salmonella enterica* culture (ATCC 14028) were similar. Simply stated, citric acid is not comparable to lactic acid in killing *Salmonella*. From this information, one would anticipate that the expected result of mixing citric acid with lactic acid would be a dilution of the antimicrobial effect of the lactic acid. Thus, it is surprising that the combination of citric acid with lactic acid, particularly in the proportions described herein, demonstrated an enhanced microbial effect against *Salmonella* compared with lactic acid alone, as shown in FIGS. 5A, B and C.

In contrast certain blends of citric and lactic acids are more effective at killing *Salmonella* than lactic acid alone. As shown in FIGS. 5A, B and C, certain mixtures of citric and lactic acid perform better at killing *Salmonella* than lactic acid alone. It is also apparent that the mixtures perform better than citric acid alone. (See, e.g., Example 1, Table 1). Apparently, the addition of some citric acid to lactic acid increases the antimicrobial effect. This occurs with the addition of citric acid down to a ratio of about 40:40 wt./wt. and more preferably down to a ratio of about 45:35 wt./wt. lactic acid to citric acid. The addition of further amounts of citric acid appears to decrease the antimicrobial effect of lactic acid in killing *Salmonella*. As used herein, an "effective amount of citric acid" means a concentration of citric acid that increases the antimicrobial effect of lactic acid vis-à-vis *Salmonella*.

The parent patent application mentions a mixture of citric and lactic acids sold commercially by Purac American, Inc., Lincolnshire, Ill., under the designation "CL 21/80." CL21/80 contains lactic acid and lactate in an amount of approximately 43-49 wt % and citric acid and citrate in an amount of approximately 29-35 wt %. The product is slightly buffered with potassium hydroxide so that is provides a pH of 2.0-2.2 in a 10% solution in water. Potassium is present in the product in an amount of about 1.2-1.5%. It is likely that some potassium citrate and potassium lactate are produced as a result and may be present in the aqueous mixture as applied to the poultry depending on the mixing procedure and timing. CL21/80 has been used primarily as an ingredient in candy making which is believed to be the reason for the buffering agent.

Figure 6A:
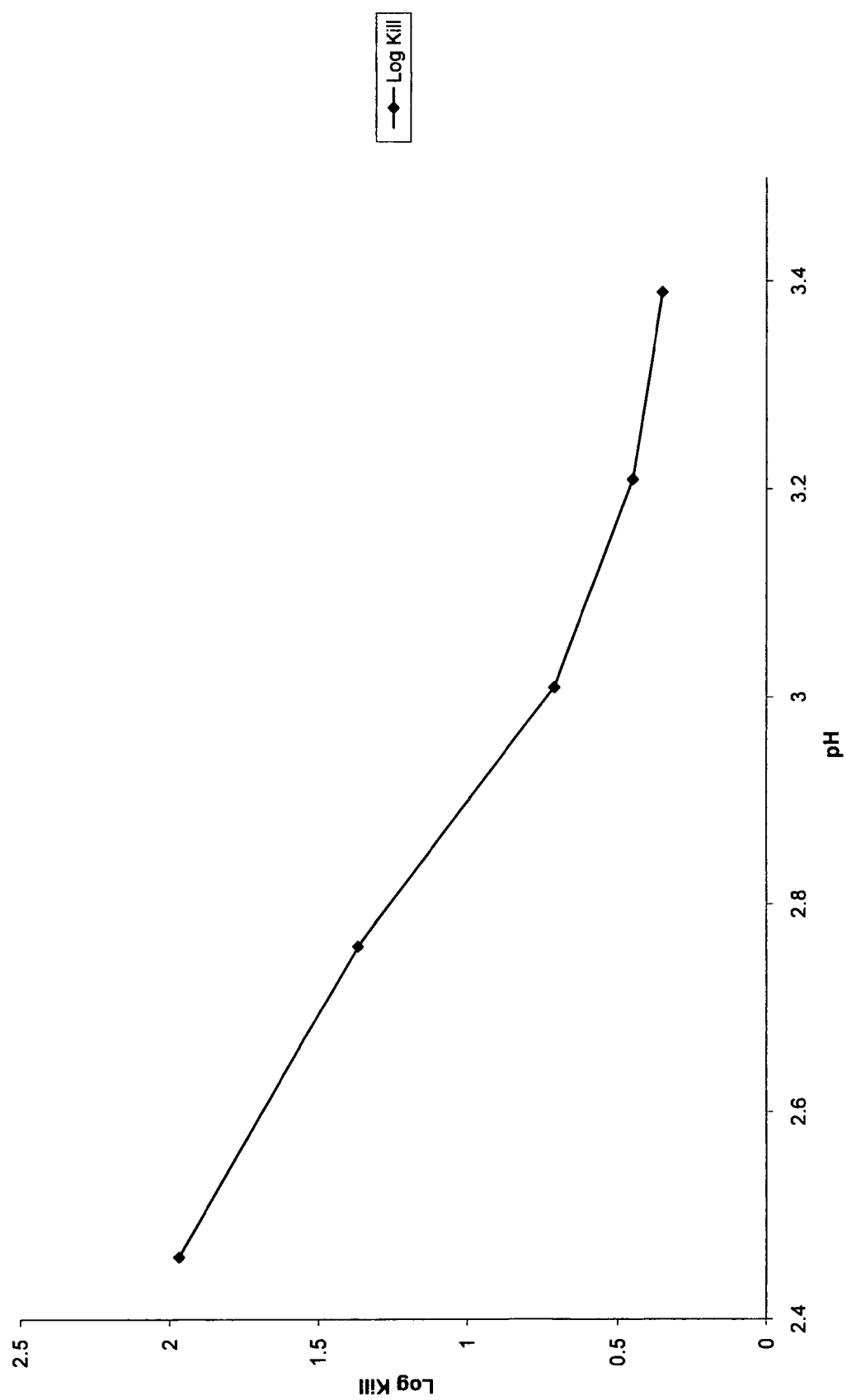
FIGS. 6A and 6B are charts depicting the results of the experiment described in Example 5 showing the effort of pH on the treatment of *Salmonella* with a solution containing a mixture of lactic and citric acids.

It has now been found that the blend of citric and lactic acids is best used at a pH of less than about 3.2 and preferably in the range of about 1.8 to 3.2. Even more preferably, the antimicrobial agent is applied at a pH of about 1.8 to about 3.0 and most preferably in the range of about 1.8 to about 2.5. This is illustrated in FIGS. 6A and B, which show the effect of pH on *Salmonella* log kill using a mixture of 3:1 wt./wt. lactic acid to citric acid at a treatment time of 30 seconds and temperature of 72 deg. F. The preferred pH ranges are intended to deliver effective antimicrobial activity and to minimize damage to the processing plant and equipment.

The blends of citric and lactic acids mentioned above may be employed in solution in amounts ranging from about 1% to approximately 2.5 wt %. The lower range is the minimum amount required for anti-microbial efficacy. Indeed, it has been found that at concentrations much above 2.3 wt %, there is a tendency for the microbial treatment to result in significant discoloration of the poultry or an off-taste or smell.

The antimicrobial mixture of citric and lactic acids may be applied following the plucking or following evisceration and prior to chilling or in both of these locations. It is also possible to use the antimicrobial treatment at other places in the processing of poultry. Application may occur for approximately 1 to 60 seconds, but application times of about 1-5 seconds are preferred.

The antimicrobial mixture may also be employed in the "post-processing" of poultry or other meat after it leaves the production facility and is processed for sale and/or consumption at a commercial facility, e.g., meat market, grocery store, restaurant, etc., as described, for example, in U.S. patent application Ser. No. 12/151,821, entitled "Method of reducing pathogens during processing or post-processing of beef and other non-poultry meats," filed May 9, 2008, and incorporated by reference herein.

The foregoing features and benefits of the present invention are illustrated by the following examples.

EXAMPLES

Example 1

An experiment was conducted to test the antimicrobial effect of lactic acid on *Salmonella* at various treatment times. A solution of 2.5 wt. % lactic acid was used in all tests.

In each instance a target sample was employed using approximately 50 micro liters of a *Salmonella* culture (given the name "M61") derived from a sample of chicken meal contaminated with chicken feces and approximately $1.5 \times 10^7$ cells per ml. The isolate was characterized using standard microbiological methods including selective and indicative culture media and other metabolic tests. The results obtained were consistent with the genus *Salmonella*.

The tests were performed at room temperature, e.g., 71 deg. F. A reaction mixture was prepared including the *Salmonella*, water and the aqueous solution of lactic acid. The reaction was permitted to proceed for the time indicated for each test in Table 1, and was terminated by the introduction of a quench buffer comprising 4.2 M potassium phosphate buffer, pH 7.2. The results of the test were evaluated using a series of 10-fold dilutions as needed to determine, on a standard plating agar, the titer of bacteria that survived the antimicrobial treatment. The plating medium was *Salmonella Shigella* agar, a medium that would allow the growth of most bacteria. The reduction in the bacteria count is expressed as the "log kill." "Log kill" is generally defined as $\log_{10}[\text{initial cfu/ml}] - \log_{10}[\text{remaining cfu/ml}]$. The results for 2.5 wt. % lactic acid at various treatment times are shown in Table 1.

For comparison purposes, a test was performed using a 2.5 wt. % solution of citric acid for 80 seconds on the same *Salmonella*.

The results are also shown in Table 1A:

TABLE 1A

| Antimicrobial Agent | Duration of Antimicrobial Treatment | *Salmonella* (M61) Log Kill |
|---|---|---|
| 2.5 wt % aqueous lactic acid | 10 sec. | 3.44 log kill |
| 2.5 wt % aqueous lactic acid | 20 sec. | 5.36 log kill |
| 2.5 wt % aqueous lactic acid | 40 sec. | >6 log kill (no surviving bacteria) |
| 2.5 wt % aqueous lactic acid | 80 sec. | >6 log kill (no surviving bacteria) |
| 2.5 wt % aqueous citric acid | 80 sec. | 0.29 log kill |

The performance of the citric acid was deemed "poor" compared to that of the lactic acid even though lactic acid was employed at the same or shorter treatment periods.

Similar tests were performed using *Salmonella enterica* ATCC 14028 instead of the M61 *Salmonella*, and tryptic soy agar was employed instead of *Salmonella Shigella* agar. The results are reported in Table 1B.

TABLE 1B

| Antimicrobial Agent | Duration of Antimicrobial Treatment | *Salmonella* (ATCC 14028) Log Kill |
|---|---|---|
| 2.5 wt % aqueous lactic acid | 15 sec. | 1.85 log kill |
| 2.5 wt % aqueous lactic acid | 30 sec. | 2.78 log kill |
| 2.5 wt % aqueous lactic acid | 45 sec. | 3.91 log kill |
| 2.5 wt % aqueous lactic acid | 60 sec. | 5.45 log kill |
| 2.5 wt % aqueous citric acid | 15 sec. | 0.56 log kill |

Again, the performance of the citric acid was substantially inferior to that of lactic acid.

Example 2

An experiment was performed using the same protocol as in Example 1, except that the duration of treatment with the antimicrobial agent was maintained constant at 20 seconds. Instead, the concentration of the lactic acid solution was varied between approximately 0.5 wt % up to approximately 2.5 wt. %. All tests were conducted at an ambient temperature of approximately 71 deg. F.

Table 2A shows the results of tests on *Salmonella* M61 *Salmonella Shigella* agar.

TABLE 2A

| % lactic | Lactic Acid Efficacy Log Kill (71 F., 20 sec) |
|---|---|
| 0.58 | 0.51 |
| 1.17 | 1.12 |
| 1.75 | 1.99 |
| 2.34 | 3.23 |
| 2.92 | 4.77 |

The log kill results are shown in FIG. 3A. These results show a steady improvement in *Salmonella* log kill with increasing concentration of lactic acid. For comparison purposes the FIG. 3A also depicts the relative log kill reduction of a 2.5 wt. % solution of citric acid at a treatment time of 80 seconds, as obtained in Example 1 (Table 1A).

The same tests were repeated using *Salmonella enterica* ATCC 14028 instead of the M61 *Salmonella*, and tryptic soy agar was employed instead of *Salmonella Shigella* agar. The results are reported in Table 2B.

TABLE 2B

| % lactic acid | Lactic Acid Efficacy Log Kill (75 F., 20 sec) |
|---|---|
| 0.5 | 0.093 |
| 1 | 0.350 |
| 1.5 | 0.982 |
| 2 | 2.08 |
| 2.5 | 4.17 |

Figure 3B:
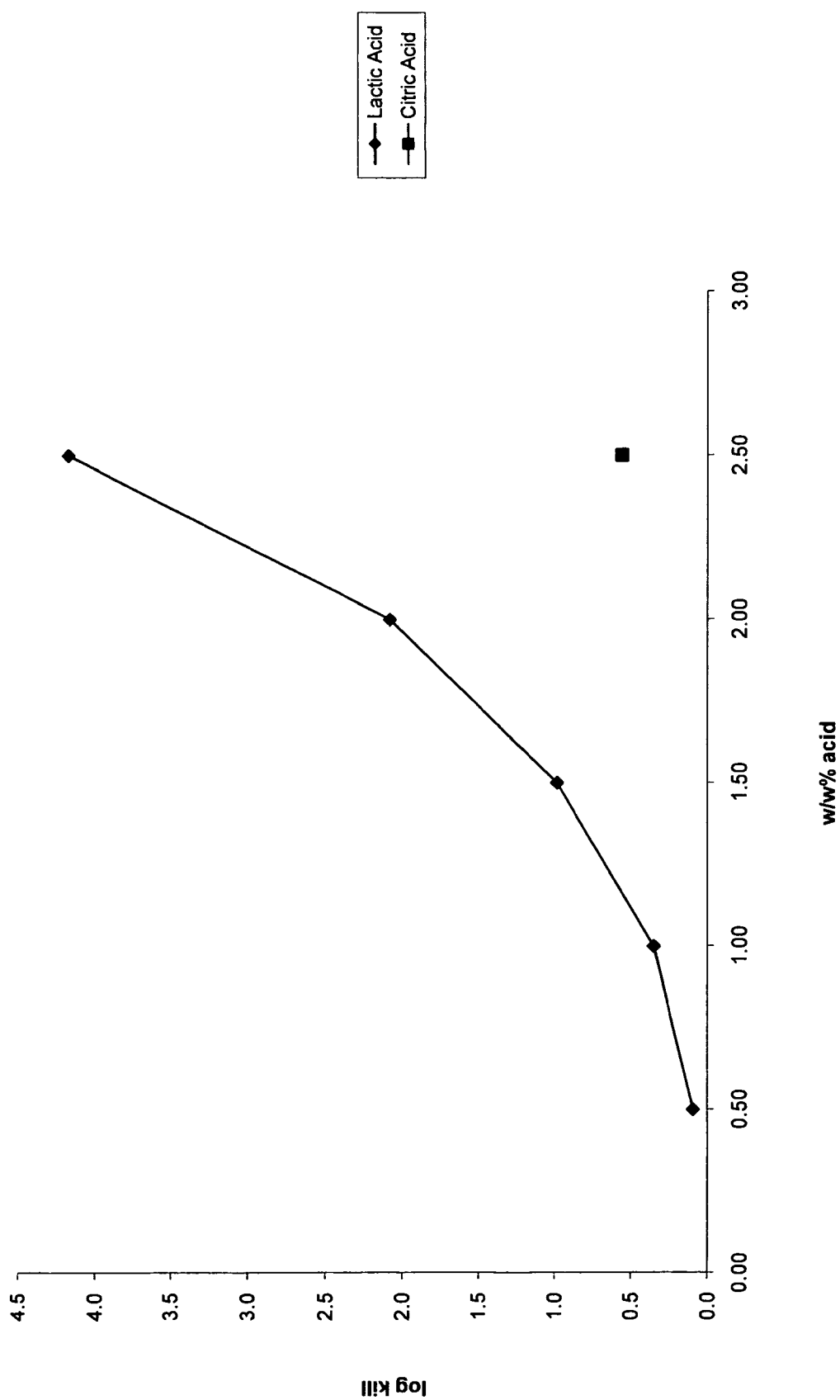

The log kill results are shown in FIG. 3B. These results show a steady improvement in *Salmonella* log kill with increasing concentration of lactic acid. For comparison purposes FIG. 3B also depicts the relative log kill reduction of a 2.5 wt. % solution of citric acid at a treatment time of 15 seconds, as obtained in Example 1 (Table 2B).

TABLE 3B

| % citric acid | Citric Acid Efficacy Log Kill (75 F., 20 sec) |
| --- | --- |
| 2.5 | 0.555 |

Example 3

An experiment was performed using the same protocol as in Example 1. In this case, the target bacteria was a sample of E. coli (given the name "SAC-d") taken from a local sewer facility. The isolate was characterized using standard microbiological methods including selective and indicative culture media and other metabolic tests. The results obtained were consistent with E. coli.

The tests employed mixtures of lactic and citric acids ranging from all lactic acid (80/0) to an equal portion of lactic and citric acids (40/40) on a wt./wt. basis. The duration of treatment was 15 seconds at an ambient temperature of 76 deg F.

TABLE 4A

| (2.5% acid, total) Escherichia coli (SAC-2) | |
| --- | --- |
| Lactic/citric | Log Kill |
| 80/0 | 0.953 |
| 75/5 | 0.755 |
| 70/10 | 0.777 |
| 65/15 | 0.479 |
| 55/25 | 0.272 |
| 45/35 | 0.272 |

Figure 4A:
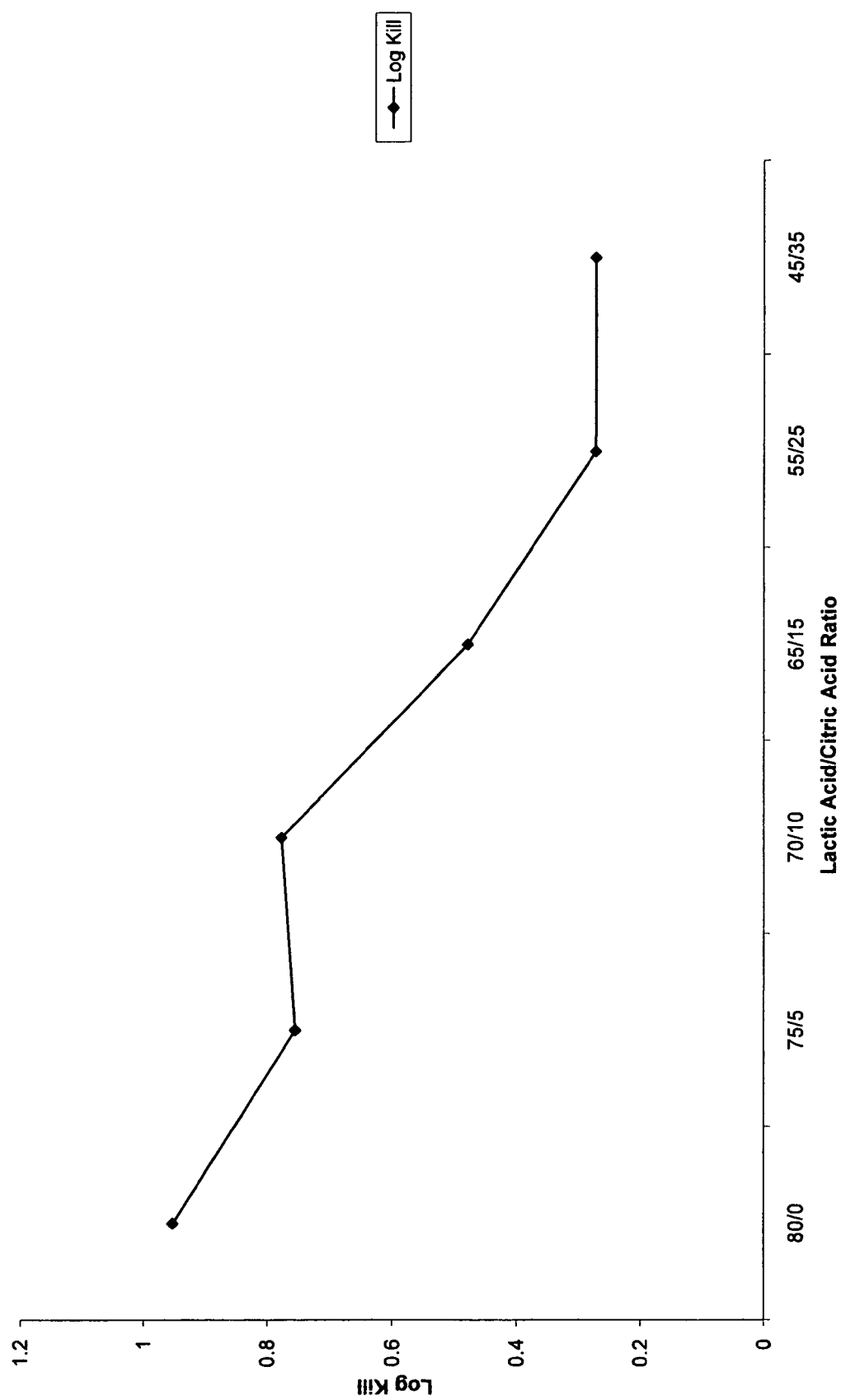
FIGS. 4A and 4B are charts depicting the results of the experiments described in Example 3 showing the effect of aqueous solutions of various lactic and citric acid blends on *Escherichia coli* ("*E. coli*").

The results are illustrated in FIG. 4A and are reported as "log kill." These results show that an increase in citric acid concentration reduces the anti-microbial effect on E. coli. In each instance the mixture of acids did not perform as well as lactic acid alone.

The same tests were repeated using E. coli ATCC 12435 instead of the SAC-2 E. coli, and tryptic soy agar was employed instead of Salmonella Shigella agar. The results are reported in Table 4B.

TABLE 4B

| (2.5% acid, total) Excherichia coli (ATCC 12435) | |
| --- | --- |
| Lactic/citric | Log Kill |
| 80/0 | 1.93 |
| 75/5 | 1.58 |
| 70/10 | 1.33 |
| 65/15 | 0.864 |
| 55/25 | 0.645 |
| 45/35 | 0.22 |

Figure 4B:
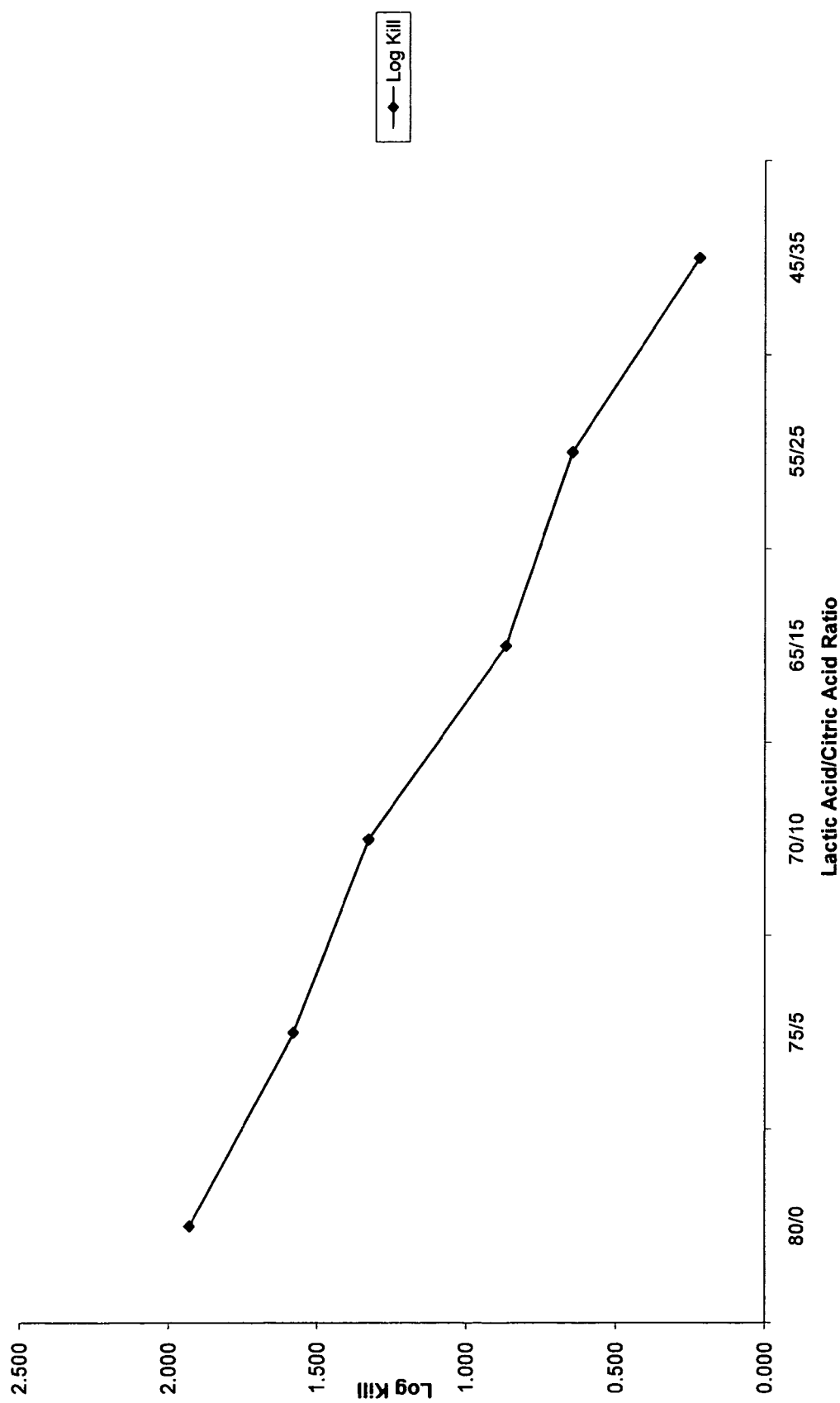

The results are illustrated in FIG. 4B. Again, the results demonstrated that an increase in citric acid concentration reduces the anti-microbial effect on E. coli. In each instance the mixture of acids did not perform as well as lactic acid alone.

Example 4

An experiment was performed using the same protocol as in Example 3. In this case, the target organism was a sample of "M61" Salmonella. The duration of the treatment was 15 seconds at ambient temperature of approximately 72 deg F. Again, the tests employed mixtures of lactic and citric acids ranging from all lactic acid (80/0) to a mixture of lactic/citric acid (55/25) on a wt./wt. basis. The results are reported in Table 5A.

TABLE 5A

| FIG. 5A (1.5% total acid) Salmonella (M61) | | |
| --- | --- | --- |
| Lactic/citric | Log Kill | Relative Kill |
| 80/0 | 1.79 | 2.13 |
| 75/5 | 1.83 | 2.35 |
| 70/10 | 1.92 | 2.84 |
| 65/15 | 1.84 | 2.4 |
| 60/20 | 1.6 | 1.37 |
| 55/25 | 1.45 | 1 |

The results are shown in FIG. 5A, which includes both log kill and relative kill (as represented by the separate lines identified in the legend on the graph). The results show that an increase in citric acid concentration in certain proportions improves the performance of the antimicrobial solution on Salmonella M61 lover that of lactic acid alone.

The same tests were repeated using Salmonella enterica ATCC 14028 instead of Salmonella M61, and tryptic soy agar was employed instead of Salmonella shigella. The results are reported in Table 5B.

TABLE 5B

Figure 5B:
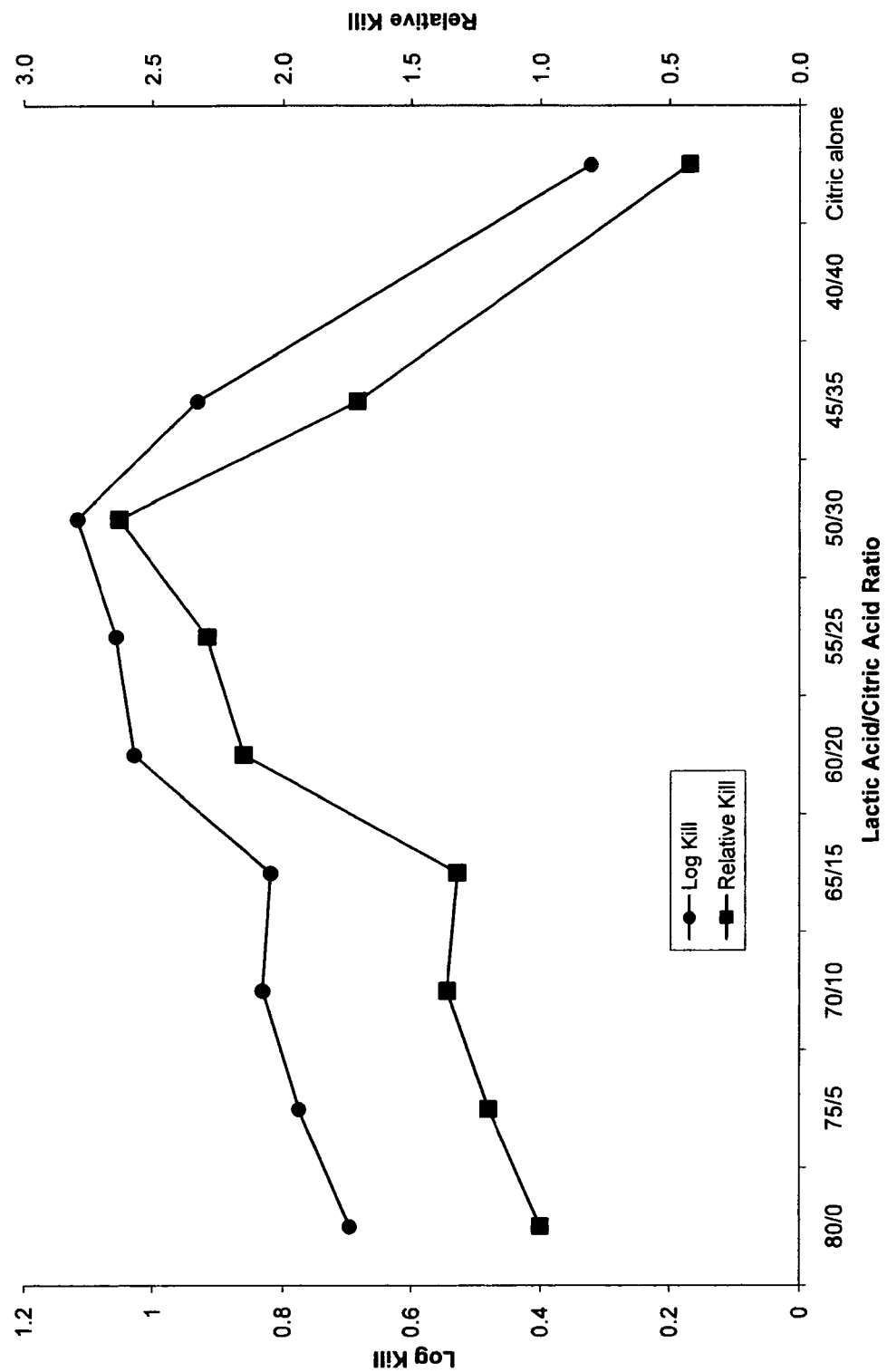

| FIG. 5B (1.5% total acid) Salmonella (ATCC 14028) | | |
| --- | --- | --- |
| Lactic/citric | Log Kill | Relative Kill |
| 80/0 | 0.697 | 1 |
| 75/5 | 0.775 | 1.2 |
| 70/10 | 0.831 | 1.36 |
| 65/15 | 0.819 | 1.32 |
| 60/20 | 1.029 | 2.15 |
| 55/25 | 1.057 | 2.29 |
| 50/30 | 1.117 | 2.63 |
| 45/35 | 0.931 | 1.71 |
| 0/80 | 0.322 | 0.422 |

The results are shown in FIG. 5B.

Another series of tests were performed as those resulting in Table 5B, except that the acids were present in a total amount of 2%. The results are reported in Table 5C.

TABLE 5C

| FIG. 5C (2.0% total acid) Salmonella (ATCC 14028) | | |
| --- | --- | --- |
| Lactic/citric | Log Kill | Relative Kill |
| 80/0 | 1.5 | 1.13 |
| 75/5 | 1.9 | 2.83 |
| 70/10 | 1.87 | 2.62 |
| 65/15 | 1.7 | 1.79 |
| 60/20 | 1.87 | 2.64 |
| 55/25 | 1.69 | 1.75 |
| 50/30 | 1.7 | 1.77 |
| 45/35 | 1.48 | 1.07 |
| 40/40 | 1.45 | 1 |
| 0/80 | 0.444 | 0.663 |

The data indicate that certain mixtures of citric and lactic acid are significantly better than others as antimicrobial agents against *Salmonella*. The preferred range includes mixtures of lactic and citric in proportions containing a predominance of lactic acid down to a minimum of about 40:40 wt./wt. lactic acid to citric acid, and preferably ranging down to about 45:35 wt./wt. lactic acid to citric acid. In one embodiment preferred mixtures include lactic and citric acid in proportions of about 77:3 on a wt./wt. basis down to a minimum of about 45:35 wt./wt. lactic to citric acid and more preferably from about 75:5 wt./wt. lactic acid to citric acid down to about 50:30 lactic acid to citric acid. In situation where a solution is employed containing about 2% total acids, the preferred range is 77:3 down to a minimum of about 45:35 wt./wt. lactic acid to citric acid solution, and more preferably down to about 55:25 wt./wt. lactic acid to citric acid.

Example 5

An experiment was performed to test the antimicrobial effect of a mixture of lactic acid and citric acids at various pH conditions. The test employed a mixture of lactic and citric acids at a weight of 60/20. The tests were performed for a treatment duration of 30 secs. At a temperature of 72 deg. F. The protocol consists of exposing the bacteria to the antimicrobial agent at the denoted pH, achieved by pre-mixing the quenching buffer with the acid. Exposure lasted for 30 secs. And was stopped by dilution of a sample of the reaction mixture into dilute phosphate buffer (100-fold). The surviving bacteria were enumerated as for the other examples.

TABLE 6A

| *Salmonella* (M61) | |
|---|---|
| pH | Log Kill |
| 2.46 | 1.97 |
| 2.76 | 1.37 |
| 3.01 | 0.71 |
| 3.21 | 0.45 |
| 3.39 | 0.35 |

The results of the *Salmonella* log kill at various values are reported in Table 6A and are depicted in FIG. 6A. These results show that a lower pH significantly improves the antimicrobial effect of the mixture of citric and lactic acids. In addition, the test shows that antimicrobial efficacy above pH 3.2 is so reduced as to render the product ineffective as a food safety intervention.

Figure 6B:
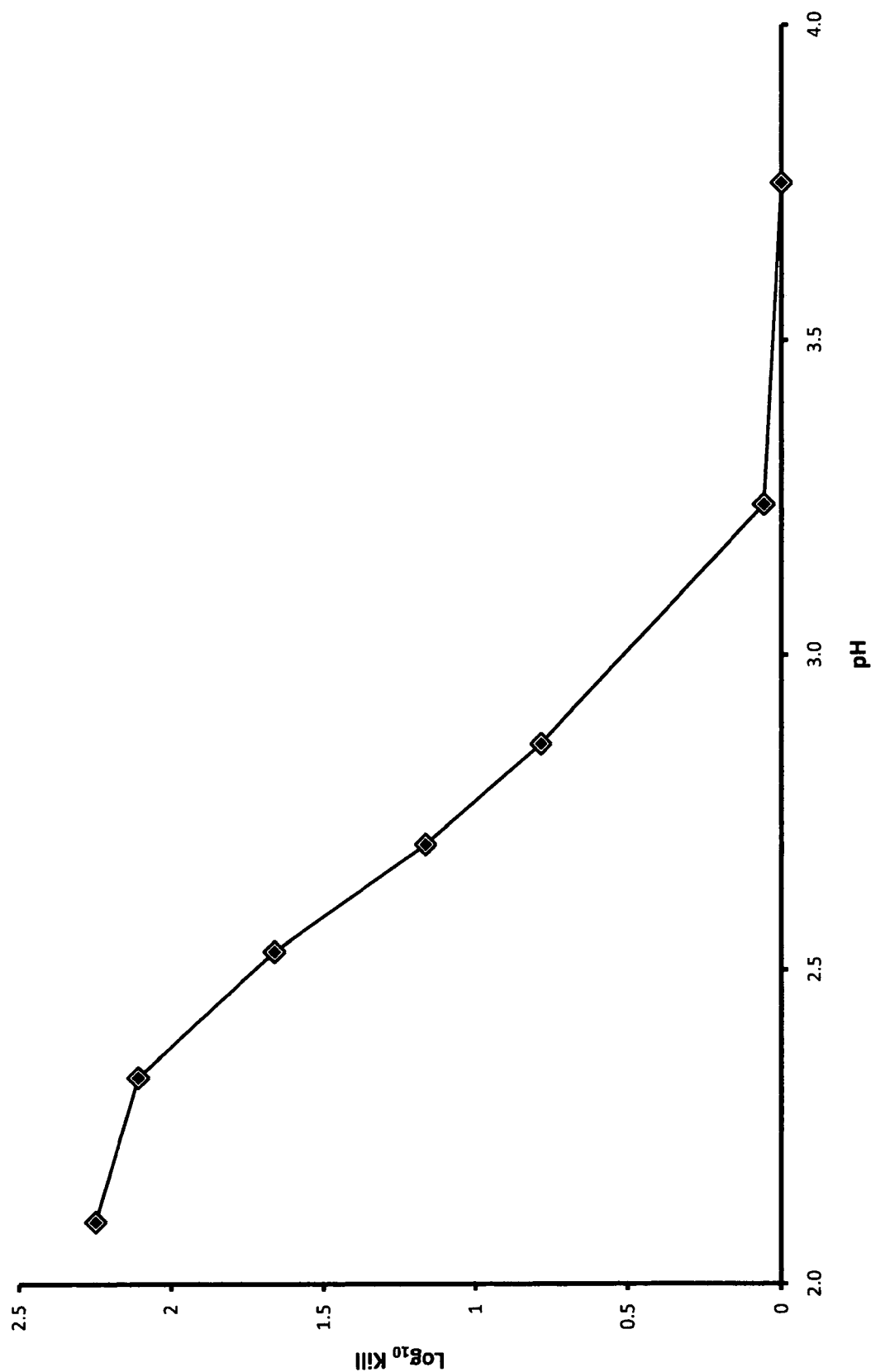

The same tests were repeated using *Salmonella enterica* ATCC 14028 instead of the M61 *Salmonella*, and tryptic soy agar was employed instead of *Salmonella Shigella* agar. The results are reported in Table 6B and depicted in FIG. 6B.

TABLE 6B

| *Salmonella* (ATCC 14028) | |
|---|---|
| pH | Log Kill |
| 2.1 | 2.25 |
| 2.33 | 2.11 |
| 2.53 | 1.66 |
| 2.7 | 1.16 |
| 2.86 | 0.79 |
| 3.24 | 0.06 |
| 3.75 | 0 |

Again, the results show that a lower pH significantly improves the antimicrobial effect of the mixture of citric and lactic acids. As in the case of *Salmonella* M61, the antimicrobial efficacy of the acid mixture was so reduced above pH 3.2 that those conditions did not appear useful as a food safety intervention.

The invention claimed is:

1. An antimicrobial solution for producing a relative kill of at least 1.7 compared to pure lactic acid for *Salmonella* ATTC 14028 in non-comminuted meat, the antimicrobial solution consisting essentially of an acid blend of lactic and citric acids wherein there is a predominance of lactic acid with citric acid being present so that there is a ratio of from 60:20 wt./wt. to 45:35 wt./wt. lactic acid to citric acid; and
   wherein the pH of the antimicrobial solution is less than 3.2.

2. The antimicrobial solution of claim 1 wherein the ratio of lactic to citric acid is 50:30 to 45:35 wt./wt.

3. The antimicrobial solution of claim 1 wherein the ratio of lactic to citric acid is 50:30 wt./wt.

4. The antimicrobial solution of claim 1 wherein the ratio of lactic to citric acid is 45:35 wt./wt.

5. The antimicrobial solution of claim 1 wherein the ratio is present in an acid blend comprising 1.5 wt. % to 2.5 wt % of the antimicrobial solution.

6. The antimicrobial solution of claim 1 wherein the pH of the solution is between about 1.8 to 3.0.

7. The antimicrobial solution of claim 1 wherein the pH of the solution is between about 1.8 to 2.5.

8. A method for producing a relative kill of at least 1.7 compared to pure lactic acid for *Salmonella* ATCC 14028 in harvested poultry comprising treating the poultry with the antimicrobial solution of claim 1.

9. The method of claim 8, wherein the ratio of lactic to citric acids is 65:15 wt./wt.

10. The method of claim 8, wherein the ratio of lactic to citric acids is 50:30 to 45:35 wt./wt.

11. The method of claim 8, wherein the ratio of lactic to citric acids is 50:30 wt./wt.

12. The method of claim 8 wherein the ratio of lactic to citric acids is 45:35 wt./wt.

13. The method of claim 8 wherein the pH of the antimicrobial solution is between about 1.8 to 3.0.

14. The method of claim 8 in which the treating of the poultry with the antimicrobial solution of citric and lactic acids occurs after removal of the feathers.

15. The method of claim 8 in which the treating of the poultry with the antimicrobial solution of citric and lactic acids occurs after evisceration.

16. The method of claim 8 in which the treating of the poultry with the antimicrobial solution of citric and lactic acids occurs after removal of the feathers and again after evisceration.

17. The method of claim 8 in which the treating with the antimicrobial solution of citric and lactic acids occurs for about 1 to 60 seconds.

18. The method of claim 8 in which the treating with the antimicrobial solution of citric and lactic acids occurs for about 5 to 10 seconds.

19. An antimicrobial solution for producing a relative kill of at least 1.7 compared to pure lactic acid for *Salmonella* ATCC 14028 in non-comminuted meat, the antimicrobial solution consisting essentially of an acid blend of lactic and citric acid, wherein there is a predominance of lactic acid with citric acid being present so that there is a ratio of from 60:20 wt./wt. to 45:35 wt./wt. lactic acid to citric acid: wherein the acid blend is 1.5 wt. % to 2.5 wt % of the antimicrobial solution; and wherein the pH of the solution is less than 3.2.

20. A method for reducing the incidence of *Salmonella* in harvested poultry comprising treating the poultry with the antimicrobial solution of claim 19.

21. The antimicrobial solution of claim 19 wherein the ratio of lactic to citric acid is from 50:30 wt. % to 45:35 wt. %.

* * * * *